Sept. 2, 1952  E. T. VAN SCIVER ET AL  2,609,160
AUTOMATIC FLY REEL
Filed Nov. 28, 1950  2 SHEETS—SHEET 1
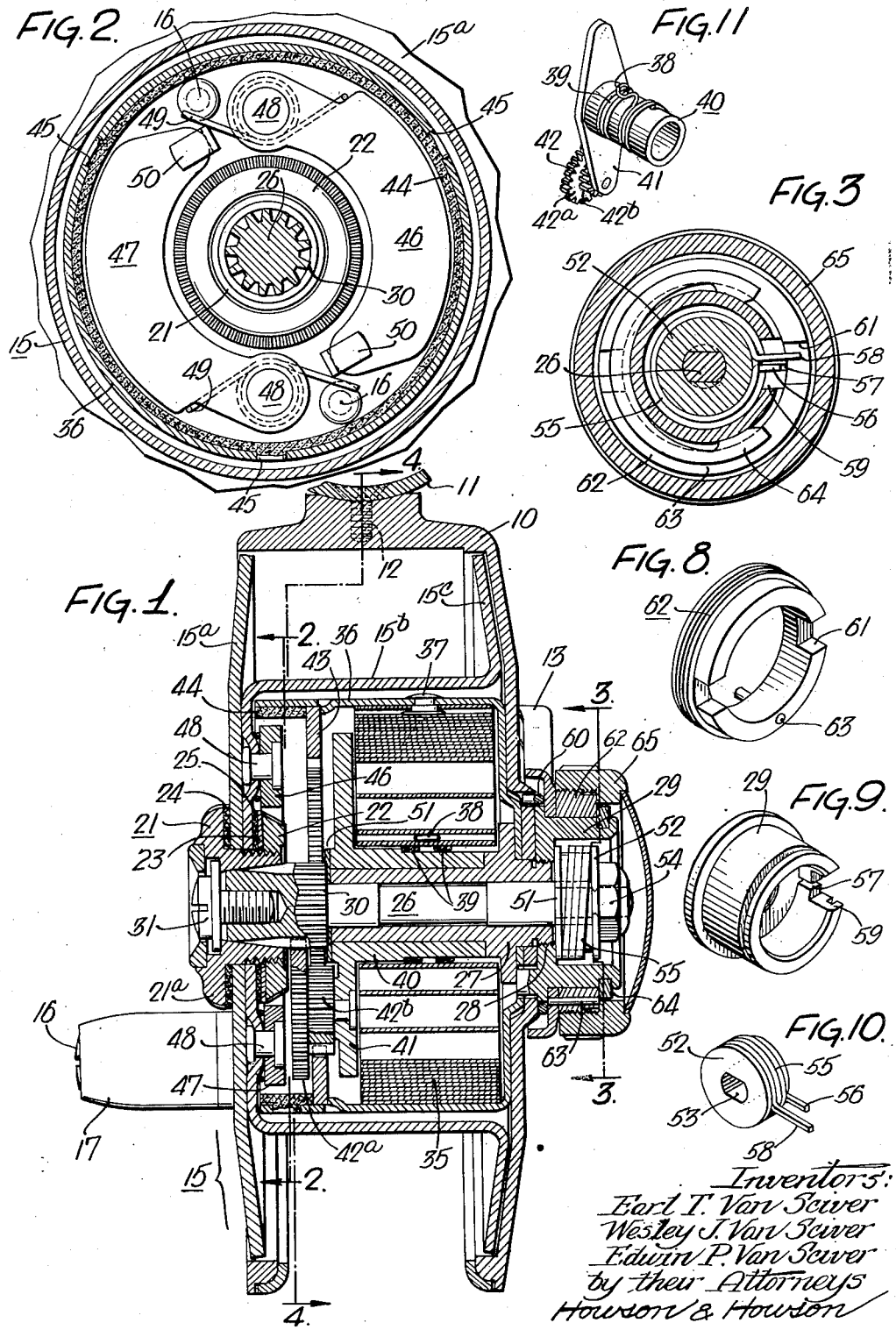
Inventors:
Earl T. Van Sciver
Wesley J. Van Sciver
Edwin P. Van Sciver
by their Attorneys
Howson & Howson Sept. 2, 1952  E. T. VAN SCIVER ET AL  2,609,160
AUTOMATIC FLY REEL
Filed Nov. 28, 1950  2 SHEETS—SHEET 2
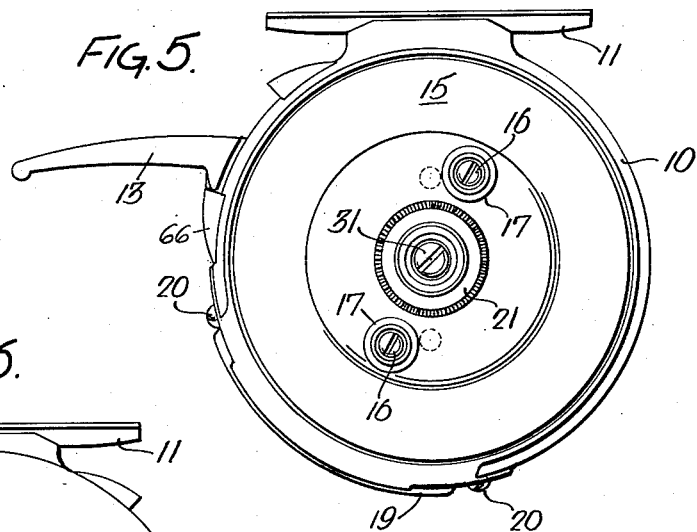
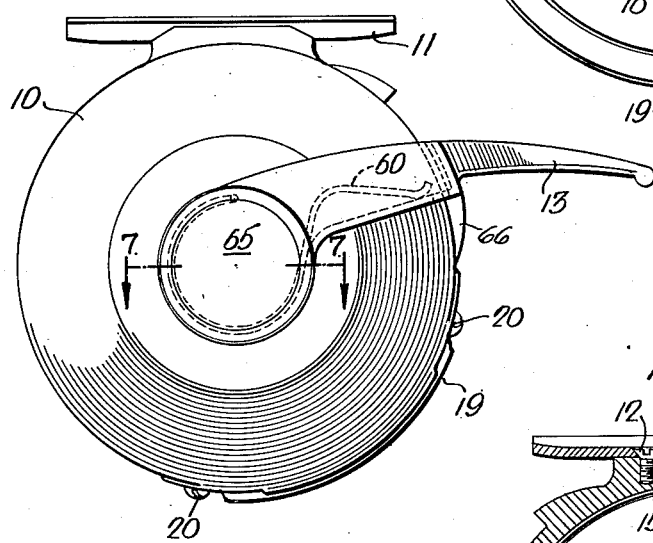
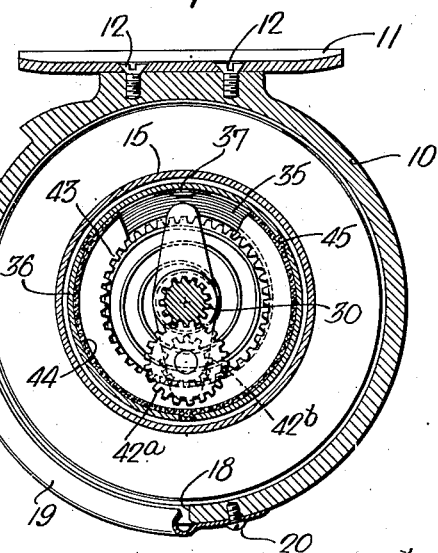
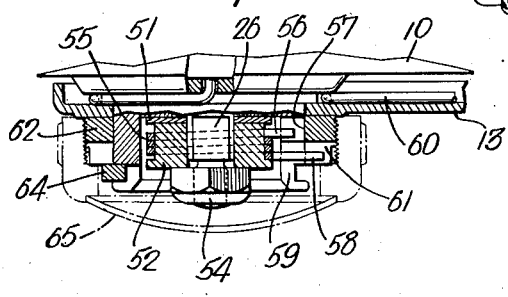
Inventors
Earl T. Van Sciver
Wesley J. Van Sciver
Edwin P. Van Sciver
by their Attorneys
Howson & Howson Patented Sept. 2, 1952

2,609,160

UNITED STATES PATENT OFFICE 2,609,160

AUTOMATIC FLY REEL

Earl T. Van Sciver, Glenside, Pa., Wesley J. Van Sciver, Palo Alto, Calif., and Edwin P. Van Sciver, Philadelphia, Pa., assignors to Ocean City Mfg. Co., Philadelphia, Pa., a corporation of Pennsylvania Application November 28, 1950, Serial No. 197,874

6 Claims. (Cl. 242—84.3)

This invention relates to automatic fly reels and more particularly to an improved compact construction for such a reel whereby limited manual operation is combined with the automatic feature.

Automatic fly reels are characterized by the provision of a main drive spring which is connected to the spool of the reel in such a way that the fisherman is enabled to retrieve all or a substantial part of his line merely by means of the spring. Reels of this type have heretofore been intricate, expensive, and have not incorporated desirable manual control features.

The present invention overcomes these disadvantages by locating the main drive spring and its associated structure within the space enclosed by the hub of the spool. This permits the spool to be quickly detached from the reel for cleaning and also to permit a fisherman to quickly exchange fishing lines by means of a plurality of preloaded spools.

A primary object of the invention therefore, is to provide a combination automatic reel in which the main drive spring is anchored to a stationary housing contained within the hub of the spool.

A further object of the invention is to provide an improved spool for an automatic reel which is supported entirely by one spool flange and which may be readily removed from the reel.

A further object of the invention is to provide an improved brake and brake release for an automatic fly reel.

A further object of the invention is to provide a simple, effective governor for controlling the take-up of an automatic fly reel.

A still further object of the invention is to provide suitable overload slip mechanisms for the main drive spring to permit complete manual turning of the spool in either direction.

Further objects will be apparent from the specification and drawings in which:

Fig. 1 is a transverse section through an automatic fishing reel constructed in accordance with the invention;

Fig. 2 is a longitudinal sectional detail as seen at 2—2 of Fig. 1;

Fig. 3 is a longitudinal sectional detail as seen at 3—3 of Fig. 1;

Fig. 4 is a longitudinal section on a reduced scale as seen at 4—4 of Fig. 1;

Fig. 5 is a left side view of the reel as installed on a fishing rod;

Fig. 6 is a right side view of the reel as installed on a fishing rod;

Fig. 7 is an enlarged sectional detail of the brake assembly as seen at 7—7 of Fig. 6;

Fig. 8-10 are perspectives showing details of the clutch assembly of Fig. 3; and Fig. 11 is a perspective of the drive shaft and its associated gears.

Referring now more particularly to the drawings, a preferred embodiment of our improved fishing reel comprises a case 10 which may be formed of a synthetic plastic material and to which a conventional stand 11 is attached by means of screws 12, 12. Automatic fly reels are customarily hung from the bottom of the fishing rod and to the rear of the hand grip. The fisherman then can conveniently operate the brake release lever 13 by means of his little finger.

The spool assembly 15 comprises a slightly dished side flange 15a and a hub 15b which is formed integrally with the opposite annular side flange 15c. Hub 15b is secured to flange 15a by studs 16, 16 on which the knobs 17, 17 are journaled. It will be understood that the spool 15 is rotatable in case 10 and that a suitable aperture 18 is provided in the housing through which the fishing line (not shown) is threaded. Aperture 18 is conveniently provided with a metallic grommet 19 secured to the case by means of screws 20, 20.

Spool 15 is rotatably mounted on clutch hub 21 which is provided with an annular flange 21a against which the spool is compressed by means of clutch nut 22, a belleville-type washer 23, and clutch friction washer 24 and 25. The adjustment of nut 22 controls the torque at which the spool 15 will turn independently of hub 21.

The spool and clutch assemblies are carried on a central pinion shaft 26 which is journaled in a stationary sleeve 27 secured in case 10 by means of the internal threads 28 on brake housing 29. One end of shaft 26 is provided with a pinion gear 30 which is tapered to provide a jam fit with the internal tapered bore of hub 21. Jam screw 31 which is retained in hub 21, permits the spool and clutch assembly to be readily detached from shaft 26.

The main driving spring 35 is contained in the stationary spring housing 36 located entirely within the hub 15b of the spool. The outer end of spring 35 is anchored on rivet 37 in housing 36 and the inner end of the spring is engaged by the tongue 38 formed on a helical contracting spring 39. Spring 39 surrounds and unidirectionally connects main spring 35 to a tubular drive shaft 40 having an integral arm 41 secured thereto at one end. Arm 41 carries a dual gear 42, one face 42a of which meshes with gear 30 on shaft 26 and the other face 42b meshes with a ring gear 43 secured in the open end of spring housing 36.

It will thus be apparent that when spool 15 is turned manually by means of knobs 17, 17, shaft 26 likewise turns provided the resistance of spring 35 is insufficient to cause the clutch washers 24 and 25 to slip on the lateral face of the spool. It will be understood that when knobs 17, 17 are turned in a clockwise direction (as seen in Figs. 4 and 5) shaft 40 likewise turns in a clockwise direction but at a reduced speed. This winds up or loads the main driving spring 35. If however, spool 15 is turned in the opposite or counterclockwise direction (as seen in Figs. 4 and 5) when spring 35 is exhaused and lever 13 raised, spring 39 tends to unwind, thus permitting it to slip on shaft 40 thereby avoiding reverse winding of the main drive spring 35.

A centrifugal friction governor is incorporated with spool 15 so that the rate of wind as caused by spring 35, may be controlled. For this purpose, we provide an annular lining 44 around the inner periphery of spring housing 36 and axially beyond the ring gear 43. Lining 44 is conveniently secured to the housing at notches 45, 45. Two centrifugal governor shoes 46 and 47 are pivotally mounted to the inner side face of spool 15 by means of headed studs 48, 48. The shoes are urged radially inward by means of fly springs 49, 49 against stops 50, 50. It will be understood that the tension of springs 49, 49 may be so controlled that when the spool turns above a predetermined speed, the shoes 46 and 47 fly radially outward to contact the lining 44 and thus retard the speed of the spool.

The energy stored in main spring 35 is retained by means of a locking assembly associated with the end of pinion shaft 26 opposite the clutch previously described. Shaft 26 is conveniently provided with one or more thrust washers 51, 51 and the shaft extends into the bore of brake housing 29. A small brake drum 52 having a flattened bore 53 is non-rotatably held on the end of shaft 26 by means of nut 54. A helical contracting brake spring 55 is wound around drum 52 in such a manner that one end 56 of the spring is seated in a notch 57 of brake housing 29. The other end 58 of spring 55, is permitted slight rotational movement in the wider notch 59 of the housing 29. Since the spring 55 is wound in a counterclockwise or left-hand manner on drum 52 (Fig. 3), it will be noted that any clockwise turning of shaft 26 and drum 52 is automatically locked by contraction of spring 55 and retention of the spring from turning by means of the control of spring end 56. In this way the energy stored in spring 35 due to counterclockwise turning of shaft 26, may be stored.

When the fisherman desires to wind in line, he can release completely or momentarily the spring 55 so that the energy in spring 35 is imparted to spool 15 to cause it to turn counterclockwise, as seen in Figs. 4 and 5. This is accomplished by raising brake release arm 13 against the tension of fly spring 60 so that the notch 61 on brake arm retaining collar 62 contacts the long spring arm 58 and turns it in a counterclockwise direction sufficiently to expand spring 55, thus permitting drum 52 and shaft 26 to turn. Collar 62 is keyed to the hub of brake release arm 13 by means of a pin 63 (Fig. 1) and both the brake arm and the collar are retained on the outer periphery of housing 29 by means of an annular key 64. A suitable cap 65 may be turned onto the threaded periphery of collar 62 to enclose the brake assembly.

In operation, the fishing line is threaded through aperture 18 and wound around the hub 15b of spool 15 by raising brake release lever 13 to release brake spring 55 and turning spool 15 in a counterclockwise direction, as seen in Fig. 5. When the line has been completely wound on the spool, the brake lever is permitted to turn until it abuts stop 66 due to the action of fly spring 60.

In accordance with the usual manner of using an automatic fly reel, line may be stripped off the reel by the fisherman as desired. This automatically winds the main driving spring 35 and should the spring become completely wound up, the spool 15 still turns due to slipping of the clutch. Once energy is stored in the spring, line may be automatically wound on the spool simply by raising the lever 13 which releases brake 55 and permits the spring to turn the spool counterclockwise as shown in Figs. 4 and 5.

It will thus be apparent that we have provided an extremely simple and efficient automatic fly casting reel. This reel may be manually operated and the construction of the spring, clutch, and brake mechanisms permits quick interchange of spools and facilitates dis-assembly and cleaning.

Having thus described our invention, we claim:

1. A combination manual and automatic fly reel, comprising a case open at one side, means for attaching said case to a fishing rod, a stationary sleeve centrally mounted in one side of said case, a drive shaft journaled on said sleeve, a stationary spring housing mounted in one side of said case, a main drive spring in said housing having one end secured to the housing and the other end secured to the drive shaft, a pinion shaft journaled in the bore of said sleeve, a clutch hub detachably secured to one end of said pinion shaft, a spool mounted on said clutch hub, a friction driving connection between said spool and said hub, driving connections between the pinion shaft and the drive shaft, said clutch and driving connections being operatively arranged to wind the drive spring on the drive shaft to store energy in the spring when the spool is turned, and braking means operatively associated with the other end of said pinion shaft for locking the pinion shaft and spool against the energy stored in the spring.

2. A combination manual and automatic fly reel, comprising a case open at one side, means for attaching said case to a fishing rod, a stationary sleeve centrally mounted in one side of said case, a drive shaft journaled on said sleeve, a stationary spring housing mounted in one side of said case, a main drive spring in said housing having one end secured to the housing and the other end connected to drive shaft, a unidirectional contracting spring enclosing the drive shaft and secured to the main drive spring, a pinion shaft journaled in the bore of said sleeve, a clutch hub detachably secured to one end of said pinion shaft, a spool mounted on said clutch hub, a friction driving connection between said spool and said hub, driving connections between the pinion shaft and the drive shaft, said clutch and driving connections being operatively arranged to wind the drive spring on the drive shaft to store energy in the spring when the spool is turned, and braking means operatively associated with the other end of said pinion shaft for locking the pinion shaft and spool against the energy stored in the spring.

3. A combination manual and automatic fly reel, comprising a case open at one side, means for attaching said case to a fishing rod, a stationary sleeve centrally mounted in one side of said case, a drive shaft journaled on said sleeve, a stationary spring housing mounted in one side of said case, a main drive spring in said housing having one end secured to the housing and the other end secured to the drive shaft, a pinion shaft journaled in the bore of said sleeve, a clutch hub detachably secured to one end of said pinion shaft, a spool mounted on said clutch hub, a friction driving connection between said spool and said hub, driving connections between the pinion shaft and the drive shaft, said clutch and driving connections being operatively arranged to wind the drive spring on the drive shaft to store energy in the spring when the spool is turned, a centrifugal governor on the spool for controlling the rate of take-up of the spool, and braking means operatively associated with the other end of said pinion shaft for locking the pinion shaft and spool against the energy stored in the spring.

4. A combination manual and automatic fly reel, comprising a case open at one side, means for attaching said case to a fishing rod, a stationary sleeve centrally mounted in one side of said case, a drive shaft journaled on said sleeve, a stationary spring housing mounted in one side of said case, a main drive spring in said housing having one end secured to the housing and the other end secured to the drive shaft, a pinion shaft journaled in the bore of said sleeve, a clutch hub detachably secured to one end of said pinion shaft, a spool mounted on said clutch hub, a friction driving connection between said spool and said hub, driving connections between the pinion shaft and the drive shaft, said clutch and driving connections being operatively arranged to wind the drive spring on the drive shaft to store energy in the spring when the spool is turned, a brake drum non-rotatably mounted on the other end of said pinion shaft, a helical contracting brake spring surrounding said brake drum, an anchor on the case whereby he pinion shaft is permitted to turn in only one direction, and means for releasing said brake spring.

5. A combination manual and automatic fly reel, comprising a case open at one side, means for attaching said case to a fishing rod, a stationary sleeve centrally mounted in one side of said case, a drive shaft journaled on said sleeve, a stationary spring housing mounted in one side of said case, a main drive spring in said housing having one end secured to the housing and the other end secured to the drive shaft, a pinion shaft journaled in the bore of said sleeve, a clutch hub detachably secured to one end of said pinion shaft, a spool mounted on said clutch hub, a friction driving connection between said spool and said hub, an arm integrally mounted on the drive shaft, a dual gear journaled at one end of said arm, a ring gear non-rotatably secured in the housing in alignment with one face of said dual gear, a pinion gear on the pinion shaft in alignment with the other face of the dual gear whereby rotation of the pinion shaft turns the drive shaft at a reduced speed due to meshing of the respective faces of the dual gear with the pinion gear and ring gear, said clutch and driving connections being operatively arranged to wind the drive spring on the drive shaft to store energy in the spring when the spool is turned, and braking means operatively associated with the other end of said pinion shaft for locking the pinion shaft and spool against the energy stored in the spring.

6. A combination manual and automatic fly reel, comprising a case open at one side, means for attaching said case to a fishing rod, a stationary sleeve centrally mounted in one side of said case, a drive shaft journaled on said sleeve, a stationary spring housing mounted in one side of said case, a main drive spring in said housing having one end secured to the housing and the other end connected to the drive shaft, a unidirectional contracting spring enclosing the drive shaft and secured to the main drive spring, a pinion shaft journaled in the bore of said sleeve, a clutch hub detachably secured to one end of said pinion shaft, a spool mounted on said clutch hub, a friction driving connection between said spool and said hub, an arm integrally mounted on the drive shaft, a dual gear journaled at one end of said arm, a ring gear non-rotatably secured in the housing in alignment with one face of said dual gear, a pinion gear on the pinion shaft in alignment with the other face of the dual gear whereby rotation of the pinion shaft turns the drive shaft at a reduced speed due to meshing of the respective faces of the dual gear with the pinion gear and ring gear, said clutch and driving connections being operatively arranged to wind the drive spring on the drive shaft to store energy in the spring when the spool is turned, a centrifugal governor on the spool for controlling the rate of take-up of the spool, a brake drum non-rotatably mounted on the other end of said pinion shaft, a helical contracting brake spring surrounding said brake drum, an anchor on the case whereby the pinion shaft is permitted to turn in only one direction, and means for releasing said brake spring.

EARL T. VAN SCIVER.
WESLEY J. VAN SCIVER.
EDWIN P. VAN SCIVER.

REFERENCES CITED

The following references are of record in the file of this patent:

UNITED STATES PATENTS

| Number | Name | Date |
|---|---|---|
| 520,517 | Corbin | May 29, 1894 |
| 1,560,919 | Unruh | Nov. 10, 1925 |
| 2,055,448 | Adams | Sept. 22, 1936 |
| 2,220,017 | Maynes | Oct. 29, 1940 |
| 2,328,672 | Quear | Sept. 7, 1943 |